United States Patent
Vildosola et al.

(10) Patent No.: US 9,881,492 B2
(45) Date of Patent: Jan. 30, 2018

(54) SECURITY SYSTEM WITH SHIELDED DEVICES

(71) Applicant: Google Inc., Mountain View, CA (US)

(72) Inventors: Alberto Abelardo Vildosola, Boulder, CO (US); John Jordan Nold, Boulder, CO (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/155,993

(22) Filed: May 16, 2016

(65) Prior Publication Data

US 2017/0330451 A1    Nov. 16, 2017

(51) Int. Cl.
  *G08B 29/18*    (2006.01)
  *G08B 29/04*    (2006.01)

(52) U.S. Cl.
  CPC ........... *G08B 29/185* (2013.01); *G08B 29/04* (2013.01)

(58) Field of Classification Search
  CPC .. G08B 25/008; G08B 25/014; G08B 25/016; G08B 29/02; G08B 29/04; G08B 29/185; G05B 19/005; G05B 19/0425; G05B 19/058; H04L 12/1895
  USPC ........... 340/506, 541, 426.15, 539.1, 539.11, 340/539.22
  See application file for complete search history.

(56) References Cited

U.S. PATENT DOCUMENTS

| | | | |
|---|---|---|---|
| 6,392,538 B1 | 5/2002 | Shere | |
| 7,113,090 B1 | 9/2006 | Saylor et al. | |
| 7,701,330 B2 * | 4/2010 | Iwamura | G08B 25/04 340/12.32 |
| 9,189,751 B2 | 11/2015 | Matsuoka et al. | |
| 9,230,560 B2 | 1/2016 | Ehsani et al. | |
| 9,299,234 B2 | 3/2016 | Haines | |
| 2005/0128068 A1 * | 6/2005 | Winick | B60R 25/1004 340/517 |
| 2008/0157964 A1 | 7/2008 | Eskildsen et al. | |
| 2009/0042604 A1 | 2/2009 | Ficquette et al. | |
| 2011/0309929 A1 * | 12/2011 | Myers | G08B 6/00 340/539.11 |

(Continued)

FOREIGN PATENT DOCUMENTS

EP    2431955 A2    3/2012

OTHER PUBLICATIONS

Extended European Search Report dated Sep. 18, 2017 as received in Application No. 17171395.1.

*Primary Examiner* — Hung T Nguyen
(74) *Attorney, Agent, or Firm* — Morris & Kamlay LLP

(57) ABSTRACT

The shielding status of a security system may be determined based on shielding statuses of individual devices in the security system. The shielding status of each individual device in the security system may be determined based on whether it is in a secured state and is properly functioning. The shielding status of the security system may be determined based on equally or unequally weighted shielding statuses of the individual devices. The shielding status of the security system may be transmitted to a mobile device carried by a user who is outside of the monitored environment. The shielding status of the security system may also be transmitted to the security monitoring company, the device vendor, or the homeowner insurance carrier, which may advertise products or services or provide incentives to the user based on the shielding status of the security system.

11 Claims, 15 Drawing Sheets

(56) References Cited

U.S. PATENT DOCUMENTS

2012/0169487 A1\* 7/2012 Poder ................... B60R 25/102
  340/426.15
2014/0282048 A1\* 9/2014 Shapiro ................. G08B 25/14
  715/741

\* cited by examiner

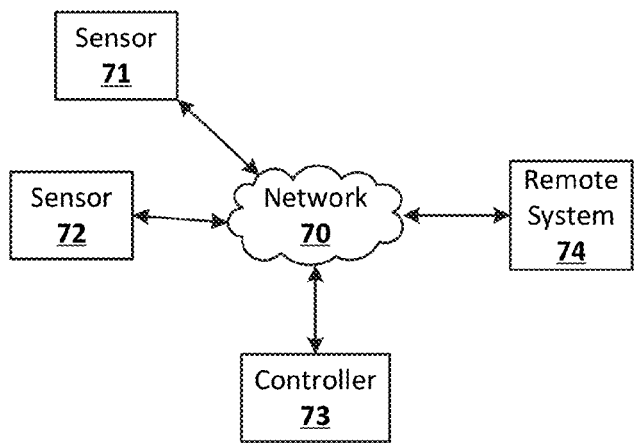
FIG. 7
FIG. 8
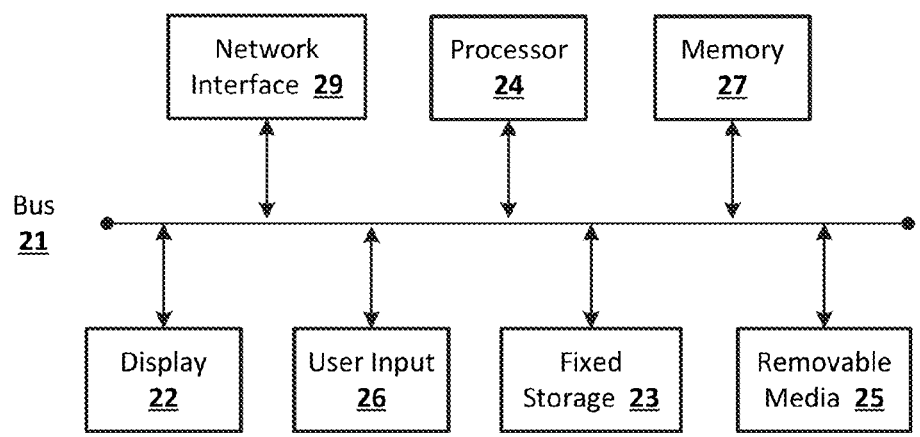

SECURITY SYSTEM WITH SHIELDED DEVICES

BACKGROUND

A conventional home security systems typically have two states or modes of operations, that is, armed and unarmed. A security system is considered "armed" when each component of the system is operational and set in a secured state, that is, a state in which the component generates a response to an event, such as an intrusion, a movement, a fire, or the presence of smoke or toxic gas. Otherwise, the security system is considered "unarmed."

BRIEF SUMMARY

According to an embodiment of the disclosed subject matter, a security system includes a plurality of devices and a processor, communicably coupled to the plurality of devices, configured to determine a shielding status of each of the plurality of devices based at least on whether each of the plurality of devices is in a secured state and is functioning, determine a shielding status of the security system based on the shielding status of each of the plurality of devices, and transmit the shielding status of the security system to a user device.

According to an embodiment of the disclosed subject matter, a method includes determining a shielding status of each of a plurality of devices in a security system based at least on whether each of the plurality of devices is in a secured state and is functioning, determining a shielding status of the security system based on the shielding status of each of the plurality of devices, and transmitting the shielding status of the security system to a user device.

According to an embodiment of the disclosed subject matter, an apparatus for determining the shielding status of a security system includes a memory and a processor in communication with the memory. In an embodiment, the processor is configured to execute instructions to determine a shielding status of each of a plurality of devices in a security system based at least on whether each of the plurality of devices is in a secured state and is functioning, determine a shielding status of the security system based on the shielding status of each of the plurality of devices, and transmit the shielding status of the security system to a user device.

According to an embodiment of the disclosed subject matter, means for determining the shielding status of a security system are provided, which include means for determining a shielding status of each of a plurality of devices in a security system based at least on whether each of the plurality of devices is in a secured state and is functioning, means for determining a shielding status of the security system based on the shielding status of each of the plurality of devices, and means for transmitting the shielding status of the security system to a user device.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 7 shows an example of a sensor network according to embodiments of the disclosed subject matter.

FIG. 8 shows an example of a computing device according to embodiments of the disclosed subject matter.

DETAILED DESCRIPTION

The binary states or modes used in conventional security systems may not provide sufficiently meaningful information on how secure the home is. According to embodiments of the disclosed subject matter, the security system is configured to determine the shielding status of each individual device in the security system. In some implementations, the shielding status of each individual device may be binary, that is, either "shielded" or "unshielded." A device is considered "shielded" if it is in a secured state and is properly working. On the other hand, a device is considered "unshielded" if it is in an unsecured state or is not properly working. Such a device may be a motion sensor, an infrared sensor, a camera, a door sensor, a window sensor, or the like, to detect human movement or intrusion, a temperature sensor, a smoke detector, a poisonous gas sensor such as a carbon monoxide sensor, or the like, to detect fire, smoke or poisonous gas, for example.

In some implementations, the shielding status of the overall security system may be determined based on the number or percentage of devices in the security system that are shielded. Alternatively or in addition, the shielding status of each individual device may be weighted, and the shielding status of the overall security system may be determined based on the weighted shielding status of each device. As a specific example, the shielding status of a door lock sensor for an exterior door or a motion sensor at or near the entrance of the exterior door may be weighted more heavily than the shielding status of a door sensor for an interior door, such as a bedroom or bathroom door. In some instances, after the shielding status of the overall security system is determined, the user may be provided incentives to purchase additional devices to improve the safety or security of the home. In some instances, the security monitoring service provider may offer discounts in subscription fees if the shielding status of the security system has been maintained at a high level over time. In some instances, an insurance provider may utilize statistics of the shielding status of a home security system over time and provide incentives or discounts in homeowner insurance premiums for properly shielded homes.

A home security system may include many devices, such as sensors for detecting movement or intrusion, sensors for detecting fire, smoke or poisonous gas, one or more keypads for arming or disarming the security system, and one or more processors to process data received from the sensors. The security system may also include one or more mobile devices which allow homeowners or users to receive alerts or to monitor the home environment when they are away from home. The home security system may be a stand-alone system or a system in communication with a security monitoring company, which may alert the law enforcement of an intrusion or the fire department of a fire.

Figure 1:
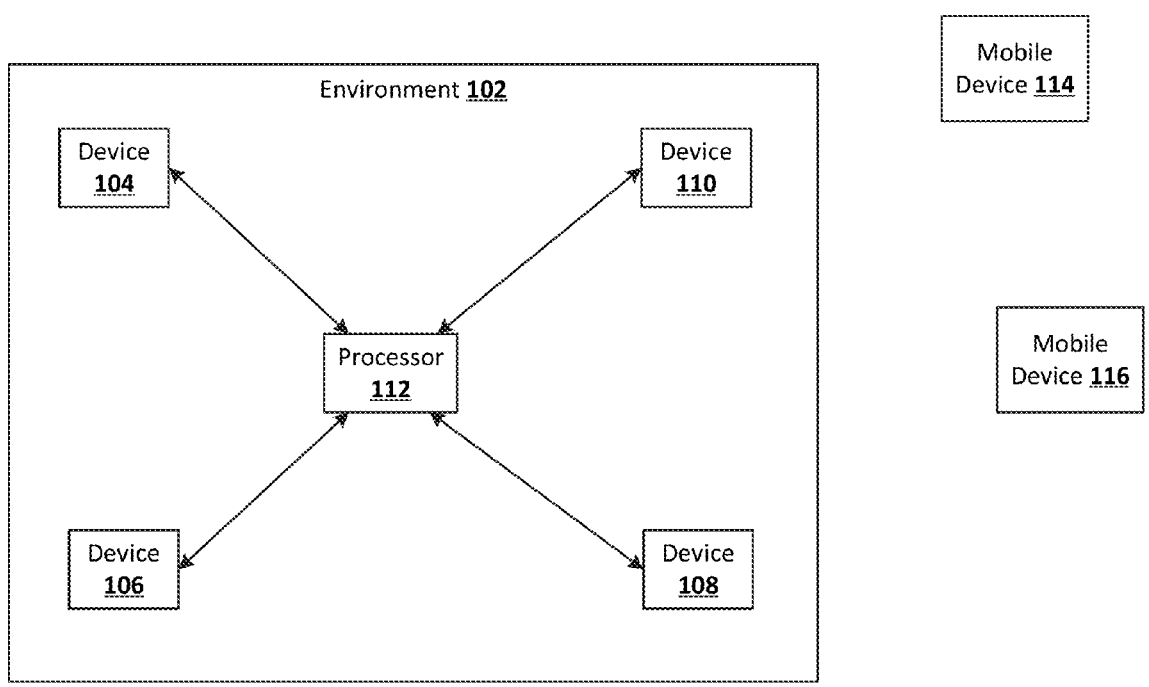
FIG. 1 shows an example of a security system according to embodiments of the disclosed subject matter.

FIG. 1 shows an example of a security system according to embodiments of the disclosed subject matter. The security system may include multiple devices 104, 106, 108 and 110 for monitoring an environment 102. The environment 102 may be an enclosed environment, such as a residential house or apartment, an office, a store, or a warehouse, for example. In some implementations, the devices 104, 106, 108 and 110 may be physically located at various locations in the environment 102 such that all areas of the environment are monitored without or with few dead spots. As described in further detail with reference to FIG. 4, various types of sensors may be implemented to monitor the environment 102. The devices 104, 106, 108 and 110 as depicted in FIG. 1 may include one or more motion sensors, one or more infrared sensors, one or more cameras, or the like, to detect the presence of humans or animals. Alternatively or in addition, the devices may include one or more door lock or door jamb sensors, one or more window lock or window jamb sensors, one or more vibration sensors, one or more magnetic or inductive sensors, or other types of sensors to detect intrusion. The devices may also include one or more temperature sensors, one or more smoke detectors, one or more poisonous gas sensors such as carbon monoxide sensors, or the like, to detect fire, smoke or poisonous gas. One or more of the devices 104, 106, 108 and 110 may be a device other than a sensor, for example, a local alarm such as a siren or flashing light, a keypad or a wireless device for arming or disarming the security system, a thermostat, a local wireless network, or another type of device in the home environment.

The security system may also include a processor 110 coupled to the devices 104, 106, 108 and 110 to process data received from the devices. In some implementations, the devices 104, 106, 108 and 110 may communicate with the processor 110 through wired or wireless connections, or a combination of both. In some implementations, one or more mobile devices 114 and 116 may be carried by the users inside or outside of the environment 102. For example, the mobile devices 114 and 116 may allow homeowners or occupants of the environment 102 to arm or disarm the security system remotely through wireless connections while they are physically outside of the environment 102. Persons with such mobile devices 114 and 116 may arm the security system when or after they leave the environment 102, or disarm the security system before they enter the environment 102. Attempts to arm or to disarm the security system may be verified by reading and matching a passcode entered on the mobile device, by reading and matching a voice command detected or a fingerprint scanned by the mobile device, or by using other biometric schemes to ensure that such attempts are made by legitimate users. In some implementations, users may remotely monitor the environment 102 through mobile devices 114 and 116, for example, by receiving video images from one or more cameras.

Figure 2:
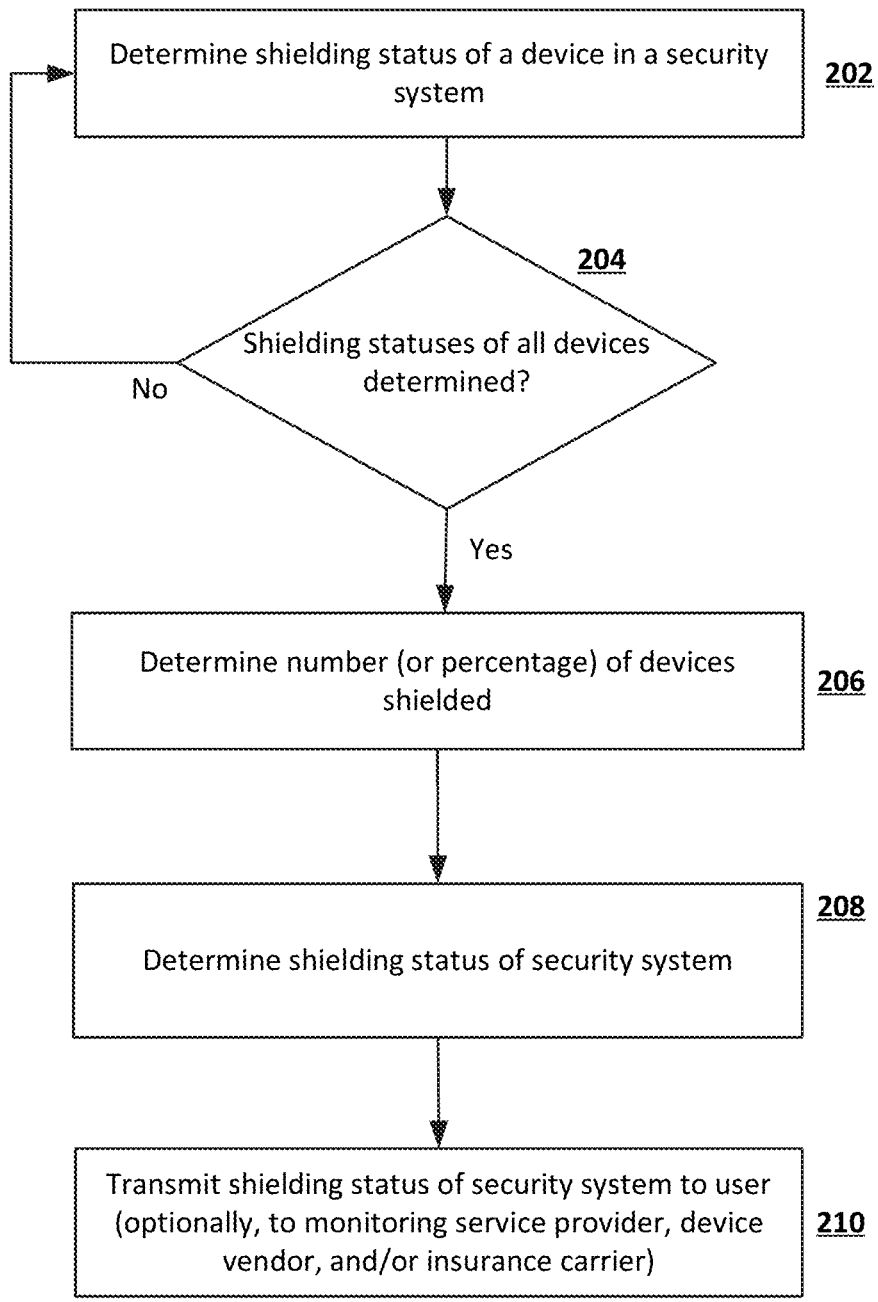
FIG. 2 shows an example of a process of determining the shielding status of a security system according to embodiments of the disclosed subject matter.

FIG. 2 shows an example of a process of determining the shielding status of a security system according to embodiments of the disclosed subject matter. The shielding status of a given device in the security system is determined in block 202. In some implementations, the shielding status of an individual device may be binary, that is, either "shielded" or "unshielded." The shielding status of a device may be set as "shielded" if it is in a secured state and is properly working. On the other hand, the shielding status of a device may be set as "unshielded" if it is in an unsecured state or is not properly working. For example, if a device requires a personal identification number (PIN) for activation, it is in an "unshielded" state if a correct PIN has not been entered to activate the device, even though the device is fully functional. A device is in a secured state if it has been armed or activated to perform its function. Otherwise, it is in an unsecured state. For example, an intrusion sensor is in a secured state if it has been activated or armed to detect intrusion. A device may be regarded as being "shielded" only if it is both in a secured state and functioning properly.

In some implementations, the shielding status of an individual device may be other than binary. For example, the shielding status of a device may be "shielded," "unshielded," or "partially shielded." If a device is in a secured state but is not fully functioning, then the shielding status of the device may be "partially shielded." For instance, a video camera may be turned on and generating video images, but may have a mechanical defect which prevents it from rotating and scanning a sector of a room that it is designed to cover. In such an instance, the video camera may be regarded as being partially shielded. The shielding status of an individual device may have more than three levels of shielding. For example, distinctions may be made between devices that are fully functional, mostly functional, somewhat functional, barely functional, and not functional at all.

In FIG. 2, after the shielding status of a given device is determined in block 202, a determination is made as to whether the shielding statuses of all devices in the security system have been determined in block 204. If the shielding status of one or more additional devices in the security system has not yet been determined, then the shielding status of one or more additional devices may be determined in block 202. If the shielding statuses of all devices in the security system have been determined in block 204, then the number of shielded devices or the percentage of shielded devices relative to the total number of devices in the security system may be determined in block 206. The shielding status of the overall security system may be determined based on the number or percentage of shielded devices in the security system in block 208.

The shielding status of the overall security system may be one of several discrete levels of shielding, or may be a number within a range of numbers with one endpoint representing complete shielding, that is, 100% shielding, and another endpoint representing no shielding, that is, 0% shielding. For example, the shielding status of the overall security system may be one of five discrete levels of shielding, i.e., 100%, 75%, 50%, 25%, and 0% shield. In some instances, different levels of shielding may be denoted figuratively or metaphorically, for example, a platinum shield, a gold shield, a silver shield, a bronze shield, or no shield. As another example, when the shielding status of the overall security system is expressed as a number in a continuum of range of numbers, it may be expressed as a percentage, a fraction, or a decimal from 0 to 1, with 0 denoting no shielding and 1 denoting complete shielding. The shielding status of the security system may be presented in various manners within the scope of the disclosure. The user may be notified of the shielding status of the security system in block 210. A notification of the shielding status of the security system may be transmitted to the mobile device carried by the user if the user is outside of the home environment, for example. In some implementations, the shielding status of the security system may be transmitted to a commercial entity, such as a security monitoring company, a security device vendor, or a homeowner insurance company, which may advertise products or services or offer incentives based on the shielding status of the security system for a given home.

In some implementations, the provider of security monitoring services, the vendor of security devices, or the homeowner insurance carrier may initiate marketing campaigns or provide incentives or discounts based on the shielding status of the security system in a given home. For example, the security monitoring service provider may offer discounts in monthly, quarterly or annual subscription fees if the shielding status of the security system is maintained at a high level over time. In some instances, the vendor of security devices may initiate marketing campaigns to homeowners whose home security systems have low shielding statuses. A low shielding status for a security system in a given home may indicate that some of the sensors or alarms may be defective or not functioning properly. The device vendor may advertise new or additional products that would provide better shielding of the overall security system for the home. In some instances, the homeowner insurance carrier may provide discounts to homeowners whose security systems have demonstrated a high level of shielding over time. In some instances, the homeowner insurance carrier may encourage homeowners whose security systems have insufficient levels of shielding to install new or additional devices by offering discounts in premiums conditioned upon the installation of new or additional devices.

Figure 3:
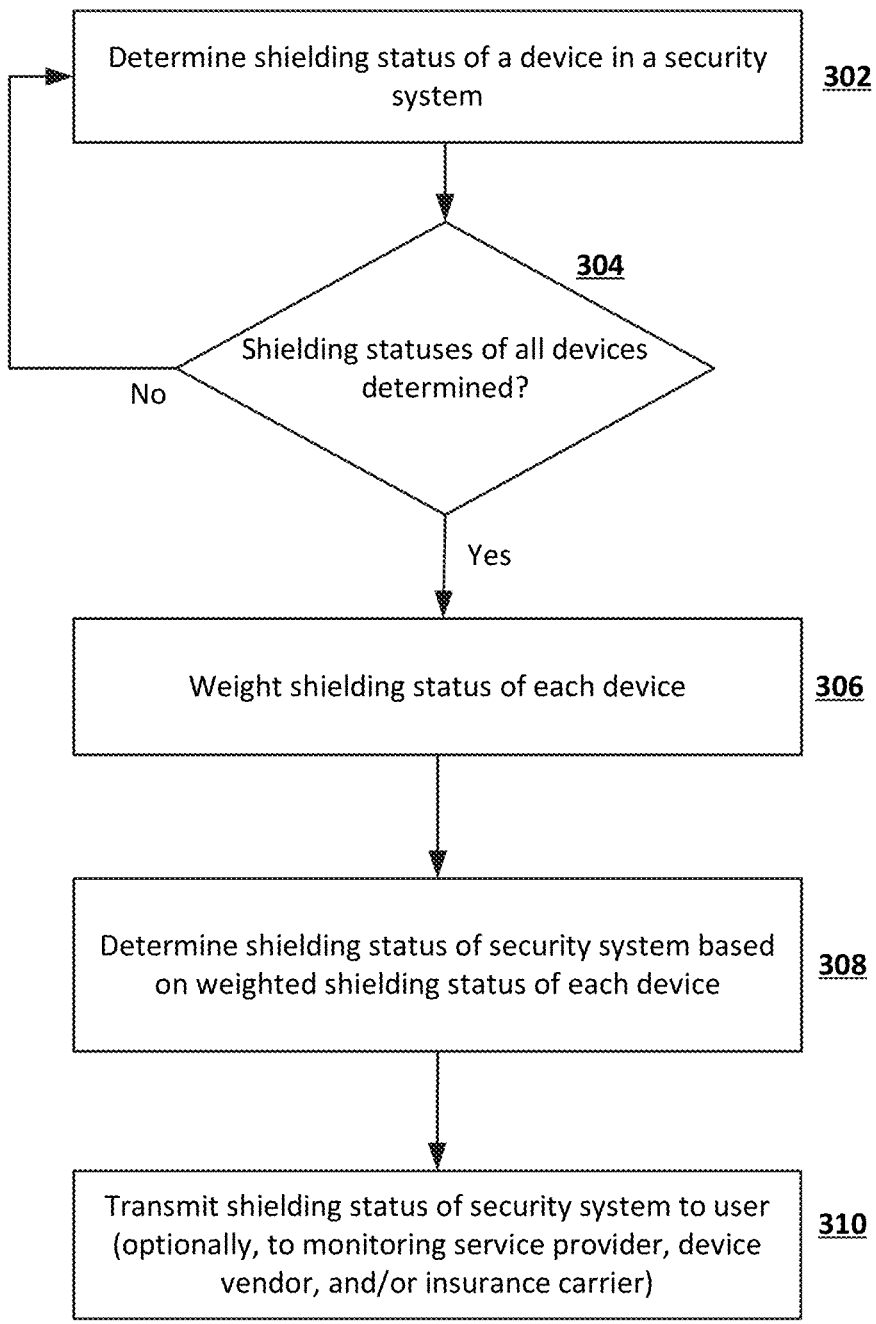
FIG. 3 shows another example of a process of determining the shielding status of a security system according to embodiments of the disclosed subject matter.

FIG. 3 shows another example of a process of determining the shielding status of a security system according to embodiments of the disclosed subject matter. In some implementations, the shielding status of each individual device in a security system need not be weighted equally in determining the shielding status of the overall security system. In some implementations, for security monitoring, the shielding statuses of sensors for detecting intrusions from outside the building may be accorded more weight than the shielding statuses of interior sensors. For example, the shielding statuses of door lock or door jamb sensors for exterior doors, window jamb sensors for exterior windows, or cameras, infrared sensors or motion sensors that are positioned to monitor the pathways near the exterior doors or windows, may be given more weight than the shielding statuses of door jamb sensors for interior doors such as bedroom or bathroom doors. In another example, for fire monitoring, the shielding status of a temperature sensor may be accorded more weight than the shielding status of a humidity sensor.

In FIG. 3, the shielding status of a given device in the security system is determined in block 302. In some implementations, the shielding status of an individual device may be binary, that is, either "shielded" or "unshielded." The shielding status of a device may be set as "shielded" if it is in a secured state and is properly working. On the other hand, the shielding status of a device may be set as "unshielded" if it is in an unsecured state or is not properly working. A device is in a secured state if it has been armed or activated to perform its function. Otherwise, it is in an unsecured state. For example, an intrusion sensor is in a secured state if it has been activated or armed to detect intrusions. A device may be regarded as being "shielded" only if it is both in a secured state and functioning properly.

In some implementations, the shielding status of an individual device may be other than binary. For example, the shielding status of a device may be "shielded," "unshielded," or "partially shielded." If a device is in a secured state but is partially but not fully functioning, then the shielding status of the device may be "partially shielded." For instance, a video camera may be turned on and generating video images, but may not be able to scan a sector of a room that it is designed to cover. In such an instance, the video camera may be regarded as being partially shielded. The shielding status of an individual device may have more than three levels of shielding. For example, distinctions may be made between devices that are fully functional, mostly functional, somewhat functional, barely functional, and not functional at all.

In FIG. 3, after the shielding status of a given device is determined in block 302, a determination is made as to whether the shielding statuses of all devices in the security system have been determined in block 304. If the shielding status of one or more additional devices in the security system has not yet been determined, then the shielding status of one or more additional devices may be determined in block 302. If the shielding statuses of all devices in the security system have been determined in block 304, then the shielding status of each of the devices in the security system is weighted in block 306. As described above, not all devices in the security system need be accorded equal weight in their shielding statuses. For example, the shielding statuses of intrusion sensors that are positioned at or near critical locations, such as exterior doors or windows, may be accorded more weight than the shielding statuses of interior sensors such as door jamb sensors for bedroom or bathroom doors. In another example, the shielding statuses of motion sensors covering rooms or areas in which critical or valuable items are stored may be accorded more weight than the shielding statuses of motion sensors covering other areas. In yet another example, for fire monitoring, the shielding status of a temperature sensor may be accorded more weight than the shielding status of a humidity sensor.

The shielding status of the overall security system may be determined based on the weighted shielding status of each of the devices in the security system in block 308. The shielding status of the overall security system may be one of several discrete levels of shielding, or may be a number within a range of numbers with one endpoint representing complete shielding and another endpoint representing no shielding. For example, the shielding status of the overall security system may be one of five discrete levels of shielding, i.e., 100%, 75%, 50%, 25%, and 0% shield. In some instances, different levels of shielding may be denoted figuratively or metaphorically, for example, a platinum shield, a gold shield, a silver shield, a bronze shield, or no shield. As another example, when the shielding status of the overall security system is expressed as a number in a continuum of range of numbers, it may be expressed as a percentage, a fraction, or a decimal from 0 to 1, with 0 denoting no shielding and 1 denoting complete shielding. The shielding status of the security system may be presented in various manners within the scope of the disclosure. The user may be notified of the shielding status of the security system in block 310. A notification of the shielding status of the security system may be transmitted to the mobile device carried by the user if the user is outside of the home environment, for example. In some implementations, the shielding status of the security system may be transmitted to the security monitoring company, the security device vendor, or the homeowner insurance company, which may advertise products or services or offer incentives or discounts based on the shielding status of the security system for a given home.

In some implementations, the security monitoring service provider, in response to receiving the shielding status of a security system for a given home, business or user account, may transmit a message to the user through a mobile device or a control panel, for example, if it determines that the shielding status of the security system indicates one or more faults in the system. In addition or as an alternative, the security monitoring service provider, the device vendor, or the homeowner insurance carrier may provide incentives, discounts, or marketing campaigns based on the shielding status of the security system in a given home. For example, the security monitoring service provider may offer a subscription fee discount if the shielding status of the security system is maintained at a high level over time. In some instances, the device vendor may initiate marketing campaigns to homeowners whose home security systems have low shielding statuses. A low shielding status for a security system in a given home may indicate that some of the sensors or alarms may need replacement. The device vendor may advertise new or additional products that would provide better shielding of the overall security system for the home. In some instances, the homeowner insurance carrier may provide discounts to homeowners whose security systems have demonstrated a high level of shielding over time. In some instances, the homeowner insurance carrier may encourage homeowners whose security systems have insufficient levels of shielding to install new or additional devices by offering discounts in premiums conditioned upon the installation of new or additional devices.

Embodiments disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment as disclosed herein. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" mode or state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 4:
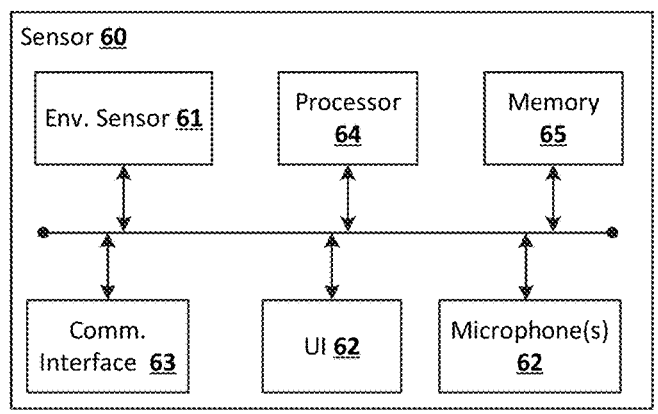
FIG. 4 shows an example of a sensor according to embodiments of the disclosed subject matter.

A sensor may include hardware in addition to the specific physical sensor that obtains information about the environment. FIG. 4 shows an example of a sensor as disclosed herein. The sensor 60 may include an environmental sensor 61, such as a temperature sensor, smoke sensor, carbon monoxide sensor, motion sensor, accelerometer, proximity sensor, infrared sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. data. A communication interface 63, such as a Wi-Fi or other wireless interface, Ethernet or other local network interface, or the like, may allow for communication by the sensor 60 with other devices. A user interface (UI) 62 may provide information and/or receive input from a user of the sensor.

The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

In some configurations, two or more sensors may generate data that can be used by a processor of a system to generate a response and/or infer a state of the environment. For example, an ambient light sensor may determine that it is dark (e.g., less than 60 lux) in the room of a home in which it is located. A microphone may detect a sound above a set threshold, such as 60 dB, in the home. The processor may determine, based on the data generated by both sensors that it should activate all of the lights in the room. In the event the processor only received data from the ambient light sensor, it may not have any basis to alter the state of the lighting in the room. Similarly, if the processor only received data from the microphone, it may not make sense to activate the lights in the room because it is daytime or bright in the room (e.g., the lights are already on). As another example, two or more sensors may communicate with one another. Thus, data generated by multiple sensors simultaneously or nearly simultaneously may be used to determine a state of an environment and, based on the determined state, generate a response.

Figure 5:
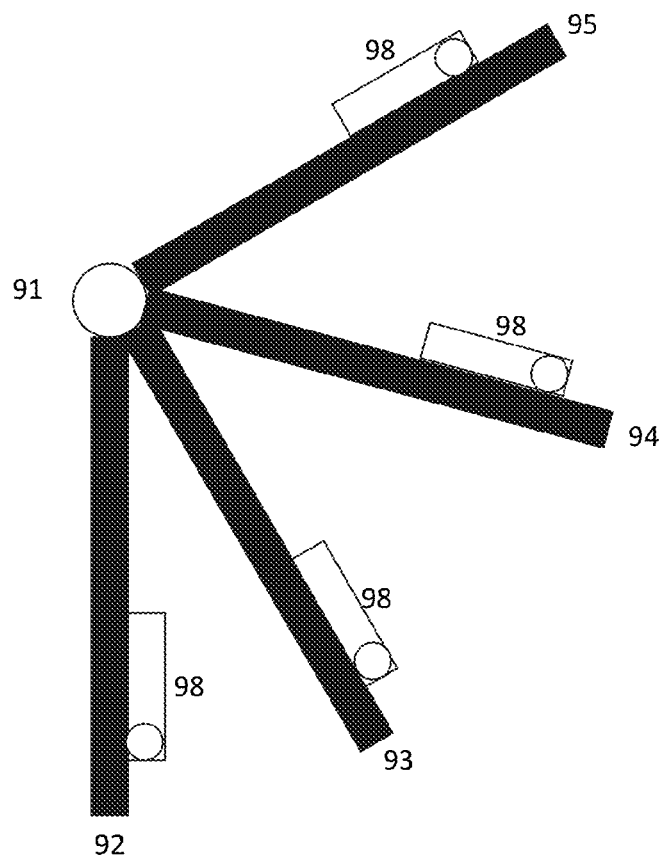
FIG. 5 shows an example of a door that opens by a hinge mechanism.

As a specific example, a security system may employ a magnetometer affixed to a door jamb and a magnet affixed to the door. When the door is closed, the magnetometer may detect the magnetic field emanating from the magnet. If the door is opened, the increased distance may cause the magnetic field near the magnetometer to be too weak to be detected by the magnetometer. If the security system is activated, it may interpret such non-detection as the door being ajar or open. In some configurations, a separate sensor or a sensor integrated into one or more of the magnetometer and/or magnet may be incorporated to provide intelligence as to the status of the door. For example, an accelerometer and/or a compass may be affixed to the door and indicate the status of the door and/or augment the data provided by the magnetometer. FIG. 5 shows a schematic representation of an example of a door that opens by a hinge mechanism 81. In the first position 82, the door is closed and the compass 98 may indicate a first direction. The door may be opened at a variety of positions as indicated by reference numerals 93, 94 and 95. The fourth position 95 may represent the maximum amount the door can be opened. Based on the compass 98 readings, the position of the door may be determined and/or distinguished more specifically than merely open or closed. In the second position 93, for example, the door may not be far enough apart for a person to enter the home. A compass or similar sensor may be used in conjunction with a magnet, such as to more precisely determine a distance from the magnet, or it may be used alone and provide environmental information based on the ambient magnetic field, as with a conventional compass.

Figure 6:
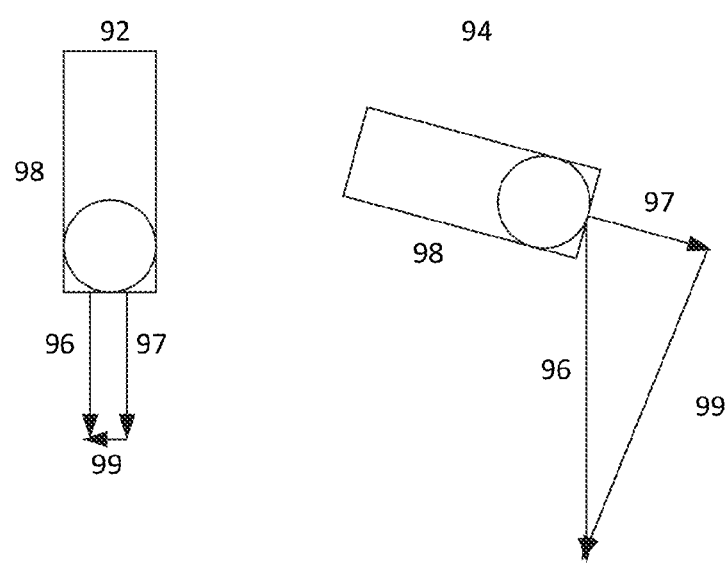
FIG. 6 shows an example of a compass in two different positions as part of a door sensor.

FIG. 6 shows a compass 98 in two different positions, 92, 94, from FIG. 5. In the first position 92, the compass detects a first direction 96. The compass's direction is indicated as 97 and it may be a known distance from a particular location. For example, when affixed to a door, the compass may automatically determine the distance from the door jamb or a user may input a distance from the door jamb. The distance representing how far away from the door jamb the door is 99 may be computed by a variety of trigonometric formulas. In the first position 92, the door is indicated as not being separate from the door jamb (i.e., closed) 99. Although features 96 and 97 are shown as distinct in FIG. 6, they may overlap entirely. In the second position 94, the distance between the door jamb and the door 99 may indicate that the door has been opened wide enough that a person may enter. Thus, the sensors may be integrated into a home security system, mesh network, or work in combination with other sensors positioned in and/or around an environment.

In some configurations, an accelerometer may be employed to indicate how quickly the door is moving. For example, the door may be lightly moving due to a breeze. This may be contrasted with a rapid movement due to a person swinging the door open. The data generated by the compass, accelerometer, and/or magnetometer may be analyzed and/or provided to a central system such as a controller 73 and/or remote system 74 as previously described. The data may be analyzed to learn a user behavior, an environment state, and/or as a component of a home security or home automation system. While the above example is described in the context of a door, a person having ordinary skill in the art will appreciate the applicability of the disclosed subject matter to other implementations such as a window, garage door, fireplace doors, vehicle windows/doors, faucet positions (e.g., an outdoor spigot), a gate, seating position, etc.

Data generated by one or more sensors may indicate patterns in the behavior of one or more users and/or an environment state over time, and thus may be used to "learn" such characteristics. For example, data generated by an ambient light sensor in a room of a house and the time of day may be stored in a local or remote storage medium with the permission of an end user. A processor in communication with the storage medium may compute a behavior based on the data generated by the light sensor. The light sensor data may indicate that the amount of light detected increases until an approximate time or time period, such as 3:30 PM, and then declines until another approximate time or time period, such as 5:30 PM, at which point there is an abrupt increase in the amount of light detected. In many cases, the amount of light detected after the second time period may be either below a dark level of light (e.g., under or equal to 60 lux) or bright (e.g., equal to or above 400 lux). In this example, the data may indicate that after 5:30 PM, an occupant is turning on/off a light as the occupant of the room in which the sensor is located enters/leaves the room. At other times, the light sensor data may indicate that no lights are turned on/off in the room. The system, therefore, may learn that occupants patterns of turning on and off lights, and may generate a response to the learned behavior. For example, at 5:30 PM, a smart home environment or other sensor network may automatically activate the lights in the room if it detects an occupant in proximity to the home. In some embodiments, such behavior patterns may be verified using other sensors. Continuing the example, user behavior regarding specific lights may be verified and/or further refined based upon states of, or data gathered by, smart switches, outlets, lamps, and the like.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

FIG. 7 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The sensor network shown in FIG. 7 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space. One or more of the sensors 71, 72 may be located inside the structure to detect the presence of one or more occupants.

In some implementations, the smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include multiple rooms separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 7 may include multiple devices, including intelligent, multi-sensing, network-connected devices that may integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entry-way interface devices (e.g., "smart doorbells"). The smart hazard detectors, smart thermostats, and smart doorbells may be the sensors 71, 72 shown in FIG. 7.

For example, a smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 7, and the controller 73 may control the HVAC system (not shown) of the structure.

As another example, a smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 7, and the controller 73 may control an alarm system to provide a visual and/or audible alarm to the user of the smart-home environment.

As another example, a smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 7 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be or include one or more of the sensors 71, 72 shown in FIG. 7. A smart wall switch may detect ambient lighting conditions, and control a power and/or dim state of one or more lights. For example, a sensor such as sensors 71, 72, may detect ambient lighting conditions, and a device such as the controller 73 may control the power to one or more lights (not shown) in the smart-home environment. Smart wall switches may also control a power state or speed of a fan, such as a ceiling fan. For example, sensors 72, 72 may detect the power and/or speed of a fan, and the controller 73 may adjusting the power and/or speed of the fan, accordingly. Smart wall plugs may control supply of power to one or more wall plugs (e.g., such that power is not supplied to the plug if nobody is detected to be within the smart-home environment). For example, one of the smart wall plugs may controls supply of power to a lamp (not shown).

In embodiments of the disclosed subject matter, a smart-home environment may include one or more intelligent, multi-sensing, network-connected entry detectors (e.g., "smart entry detectors"). Such detectors may be or include one or more of the sensors 71, 72 shown in FIG. 7. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 7 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of a smart-home environment (e.g., as illustrated as sensors 71, 72 of FIG. 7 can be communicatively coupled to each other via the network 70, and to the controller 73 and/or remote system 74 to provide security, safety, and/or comfort for the smart home environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment may "learn" who a user (e.g., an authorized user) is and permit the electronic devices associated with those individuals to control the network-connected smart devices of the smart-home environment (e.g., devices communicatively coupled to the network 70), in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

A smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event, any of the network-connected smart devices, such as smart wall plugs located outdoors, detect movement at night time, the controller 73 and/or remote system 74 can activate the outdoor lighting system and/or other lights in the smart-home environment.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. Thus, the user may have control over how information is collected about the user and used by a system as disclosed herein.

Embodiments of the presently disclosed subject matter may be implemented in and used with a variety of computing devices. FIG. 8 shows an example of a computing device 20 suitable for implementing embodiments of the presently disclosed subject matter. For example, the device 20 may be used to implement a controller, a device including sensors as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, Wi-Fi, Bluetooth®, near-field, and the like. For example, the network interface 29 may allow the device to communicate with other computers via one or more local, wide-area, or other communication networks, as described in further detail herein.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

Figure 9:
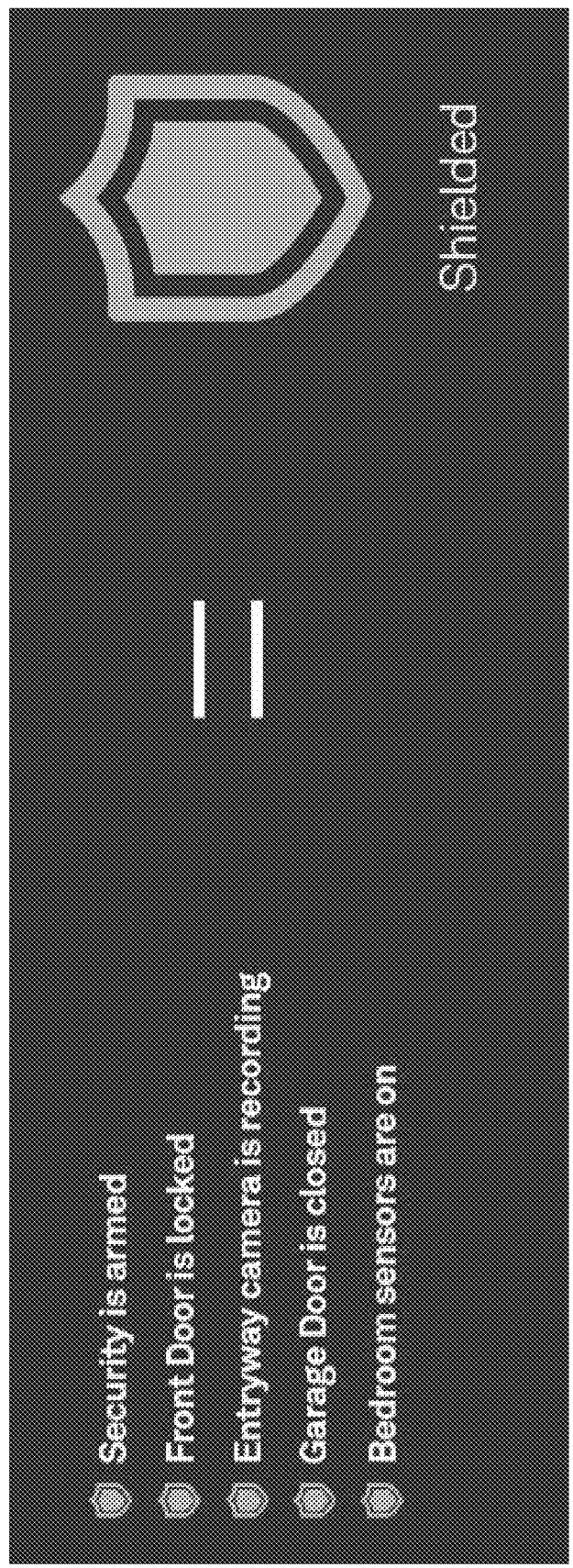
FIG. 9 shows an example illustrating a shielded status for a home environment on a mobile device.

FIG. 9 shows an example illustrating a shielded status for a home environment as part of a user interface (UI) on the touchscreen of a mobile device. In the example shown in FIG. 9, the security system is armed, the front door is locked, the entry way camera is on and recording, the garage door is closed, and the bedroom sensors are on. In FIG. 9, the shielding status of each of the components is indicated by a chevron with a completely filled interior area. When all of these conditions are satisfied, the shielding status of the home environment is "shielded," that is, completely shielded. In FIG. 9, the shielding status shown on the UI of a mobile device may be in the shape of a chevron, and the interior area of the chevron may be completely filled. In other implementations, the shielding status of the home environment may be indicated in various manners, by using different icons, symbols, or other graphical representations on the UI of the mobile device. In some implementations, the user may touch the icon on the mobile device indicating the shielded status of the home environment, and the mobile device may in response provide more detailed information on monitoring of the home environment, for example.

Figure 10:
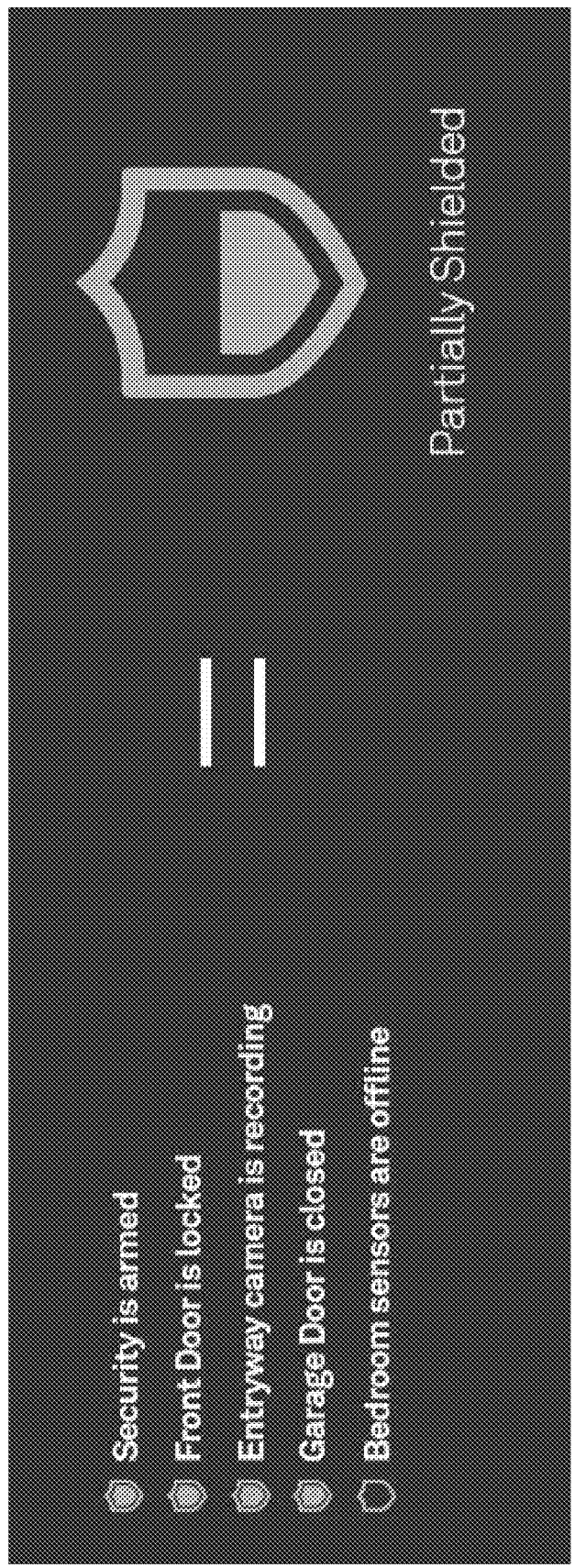
FIG. 10 shows an example illustrating a partially shielded status for a home environment on a mobile device.

FIG. 10 shows an example illustrating a partially shielded status for a home environment on a mobile device. In the example shown in FIG. 10, the security system is armed, the front door is locked, the entry way camera is on and recording, and the garage door is closed. However, the bedroom sensors are unarmed or not working properly. The shielding status of the bedroom sensors is indicated by a chevron with an unfilled interior area, whereas the shielding statuses of the other components are indicated by chevrons with filled interior areas. In FIG. 10, the shielding status of the home environment is "partially shielded" due to the non-operating status of the bedroom sensors. The shielding status shown on the UI of a mobile device may be in the shape of a chevron, with a partially filled or half-filled interior area, as shown in FIG. 10. In other implementations, partial shielding of the home environment may be indicated in various manners, by using different icons, symbols, or other graphical representations on the UI of the mobile device. In some implementations, the user may touch the icon, such as the partially filled chevron, on the mobile device indicating the partially shielded status of the home environment, and the mobile device may in response provide more detailed information, for example, which components of the home security system are armed and working and which ones are not.

Figure 11:
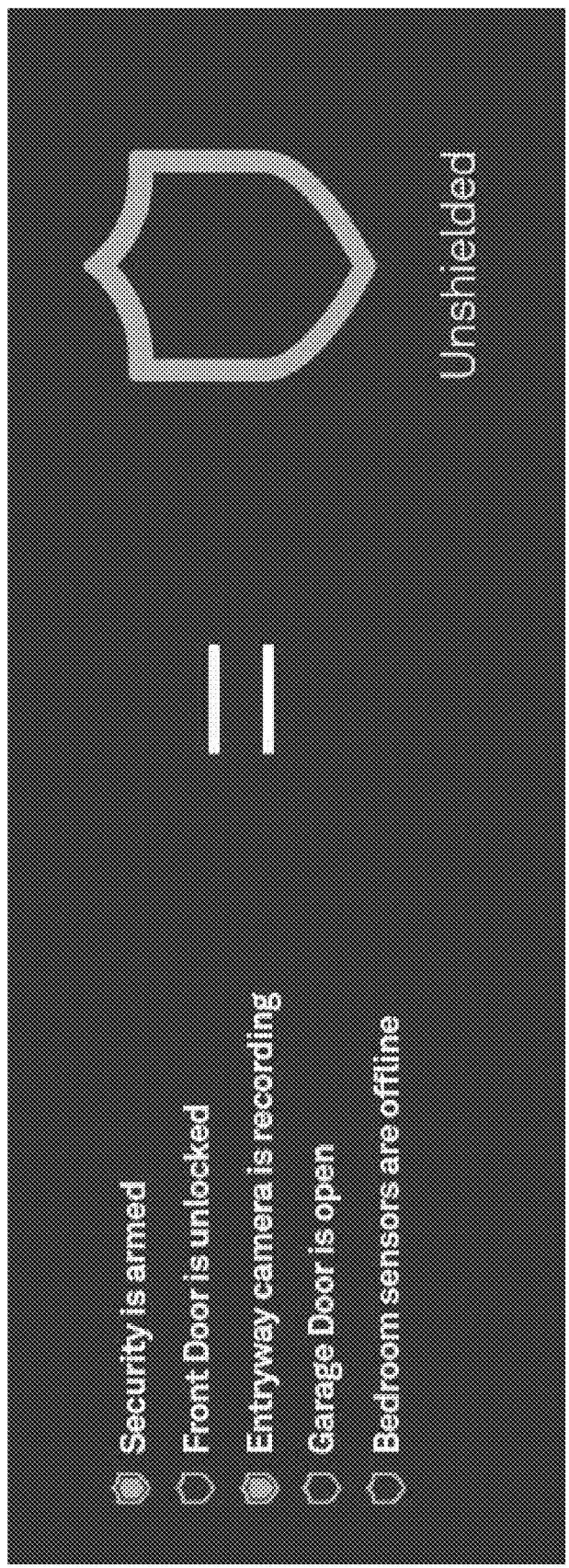
FIG. 11 shows an example illustrating an unshielded status for a home environment on a mobile device.

FIG. 11 shows an example illustrating an unshielded status for a home environment on a mobile device. In the example shown in FIG. 11, the security system is armed and the entry way camera is on and recording. However, the front door is unlocked, the garage door is open, and the bedroom sensors are unarmed or not working properly. As shown in FIG. 11, the shielding statuses of the security system and the entry camera are indicated by filled chevrons, while the shielding statuses of the front door, the garage door and the bedroom sensors are indicated by unfilled chevrons. In FIG. 11, the shielding status of the home environment is "unshielded" due to the non-operating statuses of the front door, the garage door, and the bedroom sensors. The shielding status shown on the UI of a mobile device may be in the shape of a chevron, with an unfilled interior area, as shown in FIG. 11. Again, in other implementations, the unshielded status of the home environment may be indicated in various manners, by using different icons, symbols, or other graphical representations on the UI of the mobile device. In addition or as an alternative, the user may be warned of the unshielded status in other manners, for example, by providing an audible alarm or voice warning on the mobile device, or a vibration on the mobile device. In some implementations, the user may touch the icon, such as the unfilled chevron, on the mobile device indicating the unshielded status of the home environment, and the mobile device may in response provide more detailed information on the operational and non-operational components of the system.

Figure 12:
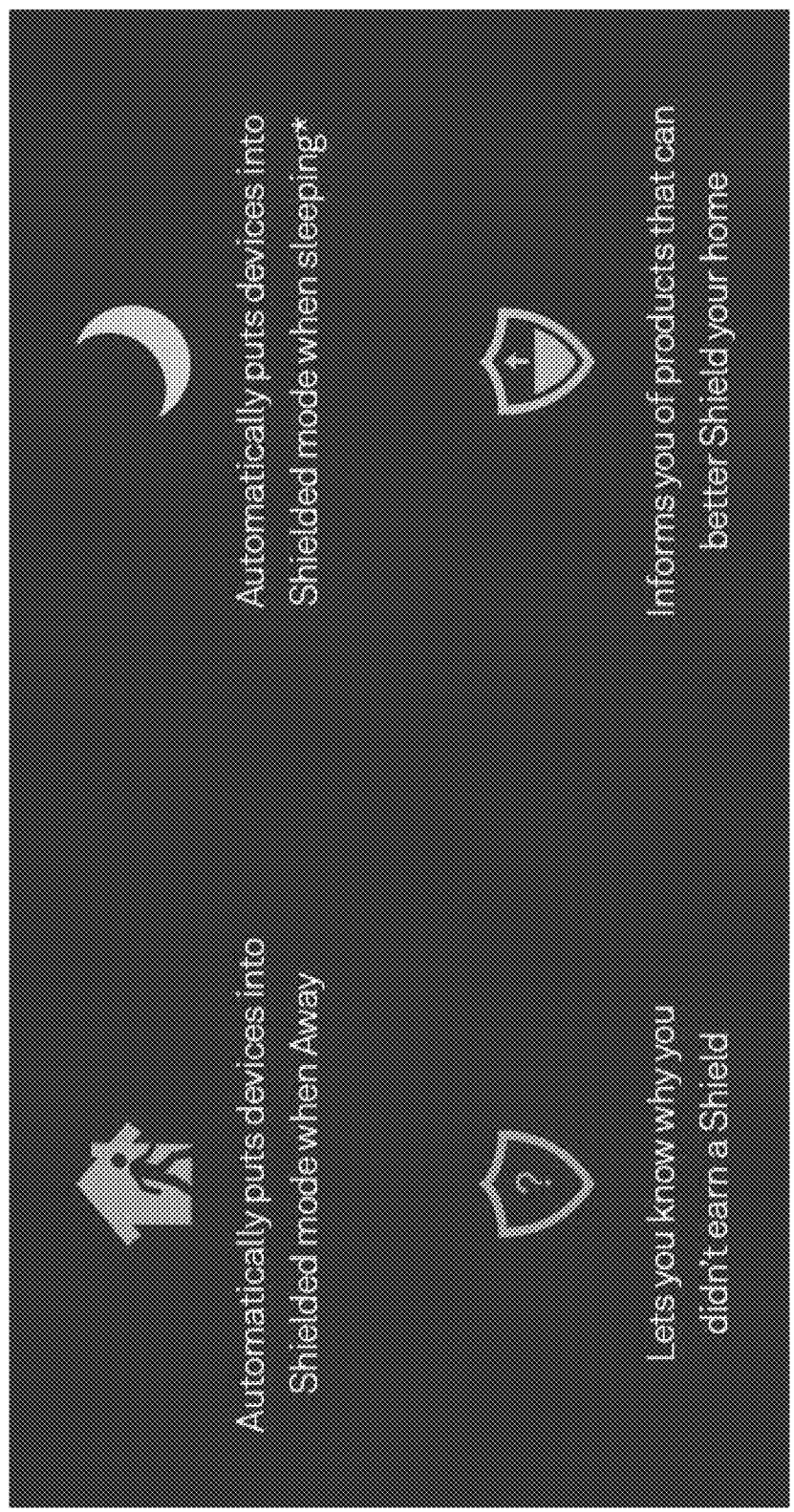
FIG. 12 shows four examples of icons as part of a user interface (UI) on a mobile device.

FIG. 12 shows four examples of icons on a mobile device. When the user is away from home, various components of the security system may be automatically placed in a shielded mode, as indicated by an icon of a person moving away from a house, for example. When the user is sleeping, various components of the security system also may be automatically placed in a shielded mode, as indicated by an icon of a crescent moon, for example. In some implementations, not all sensors of the security system need be armed when the user is sleeping. For example, it may be desirable that the door and window sensors be armed but the motion sensors and cameras be unarmed when the user is sleeping. In some implementations, if the overall shielding status of the home environment is partially shielded or unshielded because one or more sensors or components of the security system is not operational, an icon in the form of a chevron and a question mark may be provided on the UI of the mobile device, for example. The user may touch the icon, and the mobile device may provide further information as to why the home environment is partially shielded or unshielded. In some implementations, an icon with a partially filled interior and an up arrow as shown in FIG. 12 may be provided on the UI to allow the user to find which products or services are available to improve the shielding status of the home environment.

Figure 13:
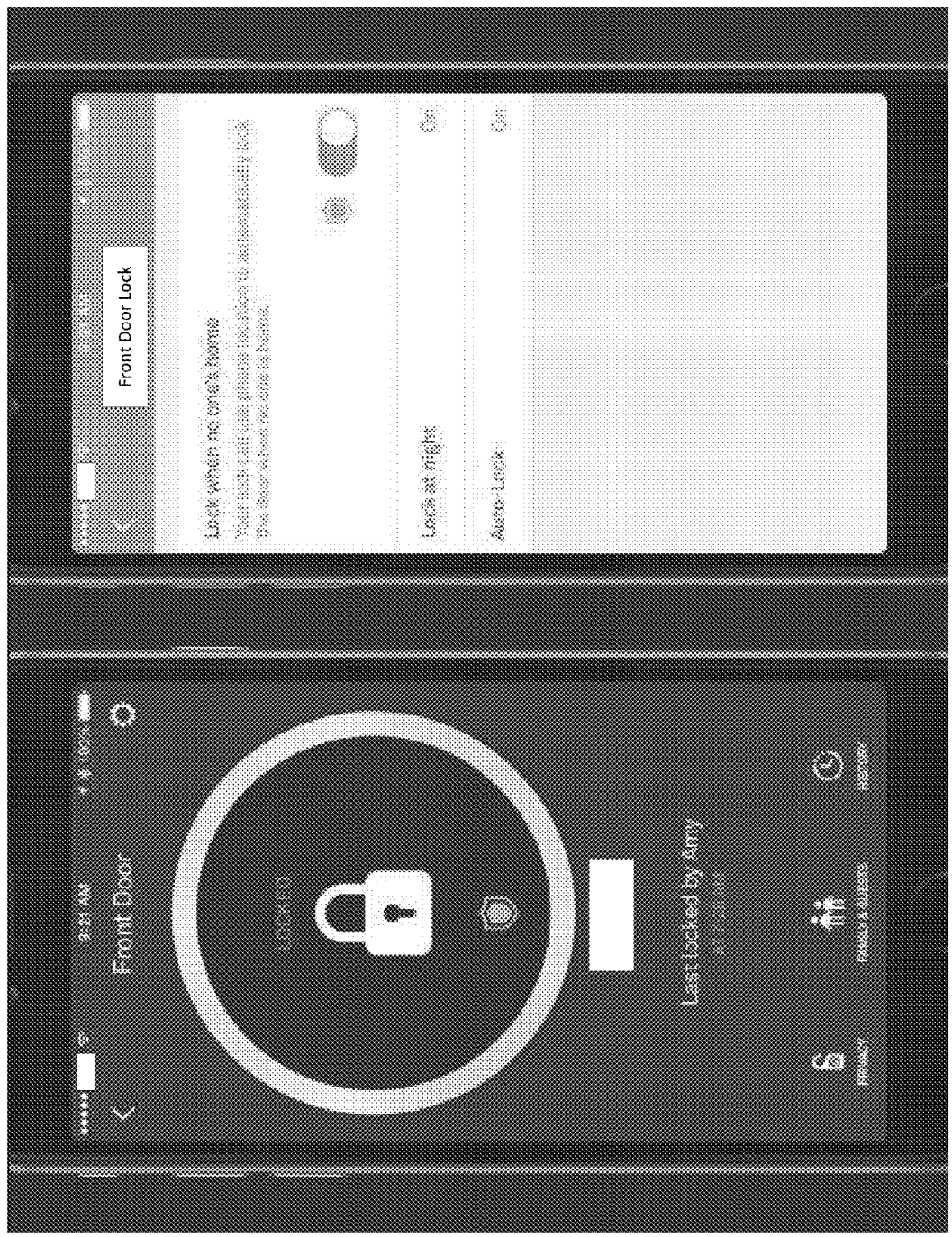
FIG. 13 shows examples of screens on a mobile device indicating the status, history, and conditions for locking a front door.

FIG. 13 shows examples of screens on a mobile device indicating the status, history, and conditions for locking a front door. A front door lock sensor may be a device that is one of the components of the home security system. In FIG. 13, the status of the front door lock is shown as "locked" in the left screen, and the person who last locked the front door and the time of the last locking may also be displayed. The right screen in FIG. 13 shows options for the user. For example, the user may choose the option to allow the security system to lock the front door automatically when no one is home. The security system may determine that no one is home and lock the front door automatically based on a detection that the mobile device carried by the user is outside of the home environment, for example. The user also may be provided an option to lock the front door automatically at night. The user may choose to disable one or more of these options by providing UI inputs on the mobile device, and lock or unlock the front door manually.

Figure 14:
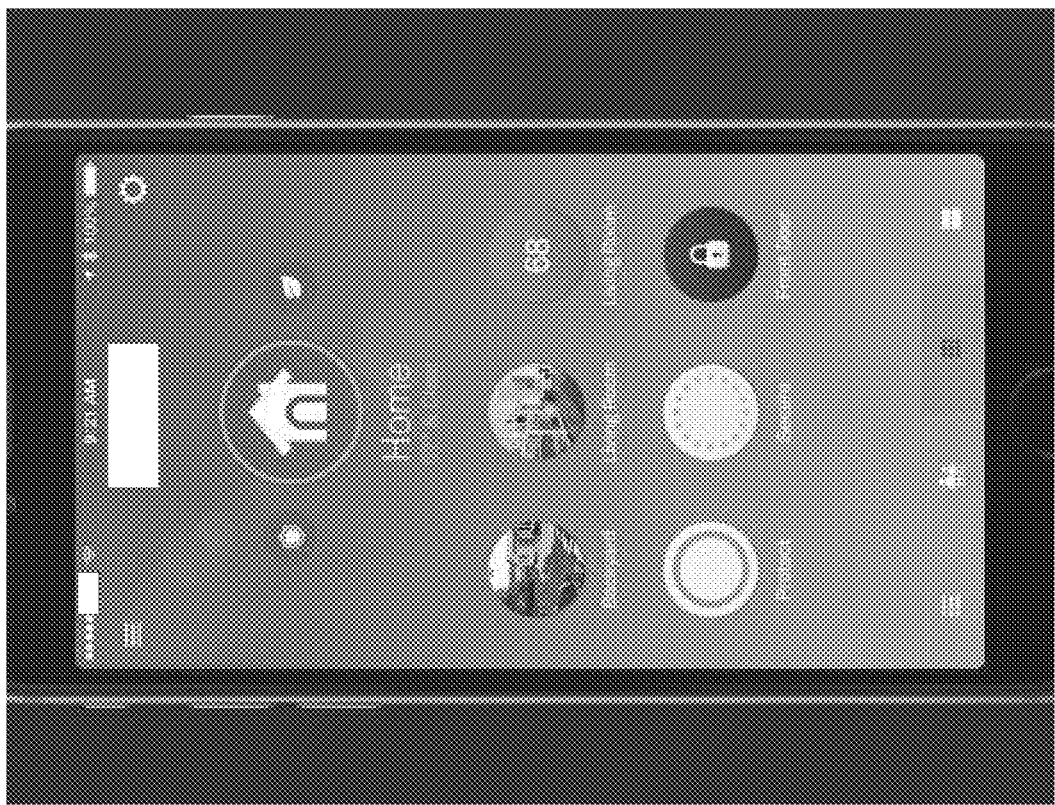
FIG. 14 shows an example of a screen on a mobile device with various icons on a mobile device for security and environmental monitoring.

FIG. 14 shows an example of a screen on a mobile device with icons including an icon for the home environment, an icon with a camera view of the backyard, an icon with a camera view of the living room, an icon indicating the temperature of the living room, an icon indicating protection, an icon indicating security, and an icon for the front door lock. In some implementations, the user may touch any of these icons for further information or for performing various functions. For example, if the user touches the icon with a camera view of the backyard or the living room, the mobile device may display the camera view on the full screen. As another example, if the user touches the icon for the front door lock, the door may be locked or unlocked.

Figure 15:
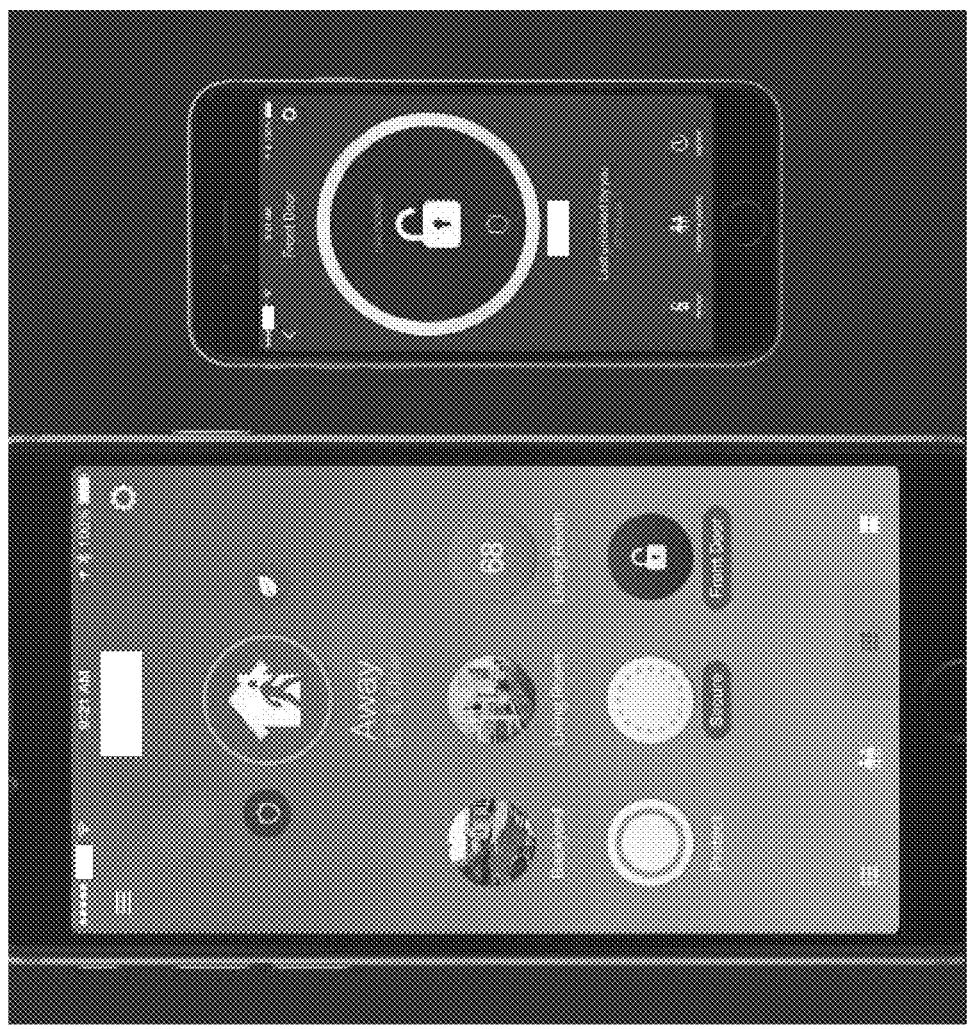
FIG. 15 shows examples of screens on the mobile device when the user touches the icon for the front door lock.

FIG. 15 shows examples of screens on the mobile device when the user touches the icon for the front door lock. When the user touches the icon for the front door lock on the left screen of FIG. 15, an enlarged icon of the front door lock is displayed in the right screen, showing that the front door is unlocked. Additional information may be shown on the screen, including an unfilled shield indicating that the front door unlocked, the person who last unlocked the front door, and the time of the last unlocking. Other information such as the presence of family members or guests, the privacy setting, and the history of locking and unlocking may also be displayed on the screen.

Figure 16:
FIG. 16 shows an example of a screen with more detailed information regarding the locking status of the front door.

FIG. 16 shows an example of a screen with more detailed information regarding the locking status of the front door. In FIG. 16, the current status of the front door is unlocked. An icon of an unfilled shield to the left of the icon indicating that the user is away from home may be touched by the user, and a menu under the unfilled shield icon may be opened. The menu may include options to allow the user to lock or unlock the front door or to arm or disarm the security system, for example. In the example shown in FIG. 16, the current status of the front door is unlocked while away. The user is provided an option to lock the door by touching "Lock" on the screen. Also in FIG. 16, the current status of the security system is shown as off while away, and the user is provided an option to arm the security system by touching "Arm" on the screen. The user also may be provided an option to lock the front door and to arm the security system automatically while away by touching "Fix all" on the screen, for example. Various other options may be provided to the user on the touchscreen within the scope of the disclosure.

Figure 17:
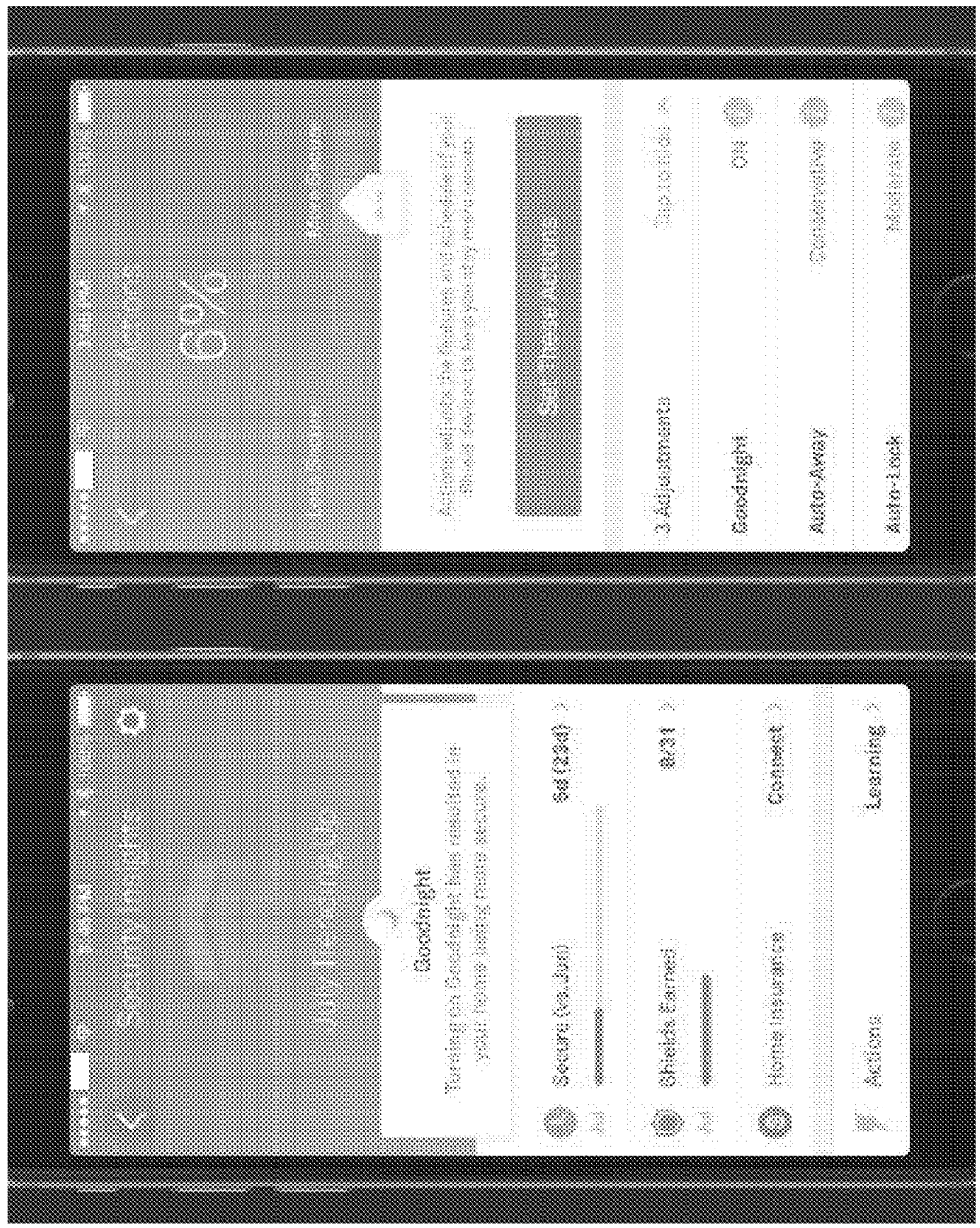
FIG. 17 shows examples of screens that provide detailed information on the shielding status of the security system and options provided to the user.

FIG. 17 shows examples of screens that provide more detailed information on the shielding status of the security system and options provided to the user. For example, the left screen of FIG. 17 shows the number of days the security system has been completely shielded in a given month compared to the previous month, the number of shields earned as the day of the month progresses, an option to connect to the home insurance carrier, and an option to be informed of actions, such as purchase of additional devices or services, that may be taken to improve the overall shielding status. The right screen of FIG. 17 shows options provided to the user to improve the overall shielding status. For example, if the "Goodnight" option is on to arm the security system automatically when the user is asleep, the overall shielding status may be improved. The user may also be provided with options for auto-away settings and auto-lock settings. Instead of providing binary options of on and off for each of the settings, the user may be provided multiple levels of options for each of the settings. For example, as shown in FIG. 17, the auto-away option is set as "conservative," meaning that the security system will be turned on automatically while no one is home, whereas the auto-lock option is set as "moderate," meaning that a notice or alarm may be provided to the user before the security system automatically locks the door upon the occurrence of a certain condition, for example, when the user leaves the house.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:
1. A security system comprising:
a plurality of devices; and
a processor, communicably coupled to the plurality of devices, configured to:
 determine a shielding status of each of the plurality of devices based at least on whether each of the plurality of devices is in a secured state and is functioning,
 weight the shielding status of each of the plurality of devices to generate a weighted shielding status of each of the plurality of devices, determine a shielding status of the security system based on the weighted shielding status of each of the plurality of devices, and transmit the shielding status of the security system to a user device, wherein the shielding status of each of the plurality of devices is one of a plurality of three or more discrete levels of shielding.

2. The security system of claim 1, wherein the processor is further configured to transmit the shielding status of the security system to an entity selected from the group consisting of a security monitoring service provider, a device vendor, and an insurance carrier.

3. The security system of claim 2, wherein the entity is configured to transmit a message indicating one or more faults in the security system to the user device based on the shielding status received from the processor.

4. The security system of claim 1, wherein the user device comprises a mobile device wirelessly coupled to the processor.

5. The security system of claim 1, wherein the shielding status of the security system is a number within a range of numbers bounded by a first number denoting no shielding and a second number denoting complete shielding.

6. A method comprising:

determining a shielding status of each of a plurality of devices in a security system based at least on whether each of the plurality of devices is in a secured state and is functioning;

weighting the shielding status of each of the plurality of devices to generate a weighted shielding status of each of the plurality of devices;

determining a shielding status of the security system based on the weighted shielding status of each of the plurality of devices; and transmitting the shielding status of the security system to a user device, wherein the shielding status of each of the plurality of devices is one of a plurality of three or more discrete levels of shielding.

7. The method of claim 6, further comprising transmitting the shielding status of the security system to an entity selected from the group consisting of a security monitoring service provider, a device vendor, and an insurance carrier.

8. The method of claim 7, wherein the entity is configured to transmit a message indicating one or more faults in the security system to the user device based on the shielding status received from the processor.

9. The method of claim 6, wherein the shielding status of the security system is a number within a range of a continuum of numbers bounded by a first number denoting no shielding and a second number denoting complete shielding.

10. An apparatus comprising:

a memory; and a processor in communication with the memory, the processor configured to execute instructions to:

determine a shielding status of each of a plurality of devices in a security system based at least on whether each of the plurality of devices is in a secured state and is functioning, weight the shielding status of each of the plurality of devices to generate a weighted shielding status of each of the plurality of devices, determine a shielding status of the security system based on the weighted shielding status of each of the plurality of devices, and transmit the shielding status of the security system to a user device wherein the shielding status of each of the plurality of devices is one of a plurality of three or more discrete levels of shielding.

11. The apparatus of claim 10, wherein the processor is further configured to transmit the shielding status of the security system to an entity selected from the group consisting of a security monitoring service provider, a device vendor, and an insurance carrier.

* * * * *